United States Patent
Bitterolf et al.

(10) Patent No.: US 10,481,578 B2
(45) Date of Patent: Nov. 19, 2019

(54) DETERMINING THE RIGIDITY OF A DRIVETRAIN OF A MACHINE, IN PARTICULAR A MACHINE TOOL OR PRODUCTION MACHINE

(71) Applicant: Siemens Aktiengesellschaft, München (DE)

(72) Inventors: David Bitterolf, Erlangen (DE); Gerhard Forster, Schwarzenbruck (DE); Elmar Schäfers, Fürth (DE); Torsten Schür, Erlangen (DE)

(73) Assignee: Siemens Aktiengesellschaft, München (DE)

( * ) Notice: Subject to any disclaimer, the term of this patent is extended or adjusted under 35 U.S.C. 154(b) by 0 days.

(21) Appl. No.: 15/780,547

(22) PCT Filed: Nov. 24, 2016

(86) PCT No.: PCT/EP2016/078636
§ 371 (c)(1),
(2) Date: May 31, 2018

(87) PCT Pub. No.: WO2017/093109
PCT Pub. Date: Jun. 8, 2017

(65) Prior Publication Data
US 2019/0018390 A1   Jan. 17, 2019

(30) Foreign Application Priority Data

Dec. 2, 2015   (EP) ..................................... 15197610

(51) Int. Cl.
*G05B 19/404*   (2006.01)
*G05B 19/401*   (2006.01)
*G05B 19/4065*   (2006.01)

(52) U.S. Cl.
CPC ......... *G05B 19/404* (2013.01); *G05B 19/401* (2013.01); *G05B 19/4065* (2013.01); *G05B 2219/41057* (2013.01)

(58) Field of Classification Search
None
See application file for complete search history.

(56) References Cited

U.S. PATENT DOCUMENTS 6,184,644 B1   2/2001   Eguchi
7,152,503 B2   12/2006  Forster et al.
(Continued)

FOREIGN PATENT DOCUMENTS

DE         3714028 A1    11/1988
DE    102008064391 A1    7/2009
(Continued)

OTHER PUBLICATIONS

PCT International Search Report and Written Opinion of International Searching Authority dated Jan. 30, 2017 corresponding to PCT International Application No. PCT/EP2016/078636 filed Nov. 24, 2016.
(Continued)

*Primary Examiner* — Sean Shechtman
(74) *Attorney, Agent, or Firm* — Henry M. Feiereisen LLC

(57) ABSTRACT

A drivetrain for linear movement of a machine component along a linear guide of a machine includes a motor with a motor-measuring system. A length-measuring system is assigned to the linear guide for determining a position of the machine component. To determine rigidity of the drivetrain, a constant acceleration for the machine component is predetermined by a numerical controller for performing closed-loop control of the movement of the machine component. The numerical controller determines a difference between a
(Continued)

position of the machine component derived from the motor-measuring system and a position of the machine component measured at the same time by the length-measuring system during the acceleration phase, and the difference is assigned to the acceleration or to a force required for the acceleration and storage in the numerical controller of the pair of values established in this way and/or of a rigidity value emanating from the pair of values.

16 Claims, 3 Drawing Sheets

(56) References Cited

U.S. PATENT DOCUMENTS

| | | | |
|---|---|---|---|
| 7,156,224 | B2 | 1/2007 | Forster et al. |
| 8,093,856 | B2 | 1/2012 | Miyaji |
| 8,157,752 | B2 | 4/2012 | Schäfers et al. |
| 8,504,307 | B2 | 8/2013 | Norihisa |
| 8,763,771 | B2 | 7/2014 | Schäfers et al. |
| 8,955,789 | B2 | 2/2015 | Schäfers et al. |
| 9,316,283 | B2 | 4/2016 | Schäfers et al. |
| 9,740,179 | B2 | 8/2017 | Schäfers et al. |
| 2003/0020427 | A1* | 1/2003 | Hamamura .......... G05B 13/042 318/632 |
| 2003/0030401 | A1* | 2/2003 | Fujishima ............ G05B 19/404 318/632 |
| 2003/0205984 | A1* | 11/2003 | Yoshida ............... G05B 19/404 318/801 |
| 2009/0171594 | A1* | 7/2009 | Norihisa ............. G05B 19/4065 702/34 |
| 2010/0092262 | A1 | 4/2010 | Schäfers et al. |
| 2013/0323460 | A1 | 12/2013 | Forster et al. |
| 2015/0355647 | A1 | 12/2015 | Bitterolf et al. |

FOREIGN PATENT DOCUMENTS

| | | |
|---|---|---|
| DE | 102009044366 A1 | 5/2010 |
| EP | 2 690 613 A1 | 7/2012 |
| JP | H08110808 A | 4/1996 |
| JP | H10326114 A | 12/1998 |
| JP | 2000322116 A | 6/2011 |
| JP | 2011115885 A | 6/2011 |
| JP | 2014174854 A | 9/2014 |

OTHER PUBLICATIONS

David Bitterolf et al, U.S. Pat. No. 8,955,789, Feb. 17, 2005, 2013-0026278, Jan. 31, 2013.

Gerhard Foster et al, U.S. Pat. No. 7,891,112, Feb. 22, 2011, 2009-0050782 A1.

Japanese Office Action dated Feb. 12, 2019 in corresponding Japanese Patent Application No. 2018-528263.

* cited by examiner

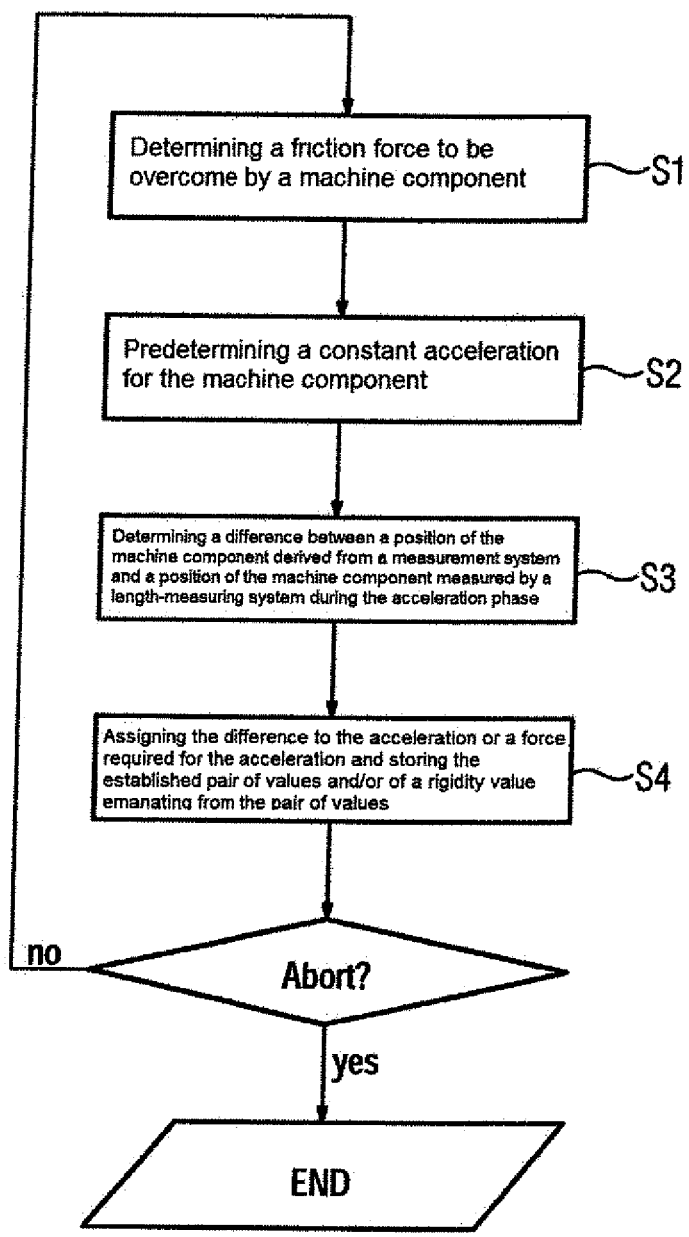

DETERMINING THE RIGIDITY OF A DRIVETRAIN OF A MACHINE, IN PARTICULAR A MACHINE TOOL OR PRODUCTION MACHINE

CROSS-REFERENCES TO RELATED APPLICATIONS

This application is the U.S. National Stage of International Application No. PCT/EP2016/078636, filed Nov. 24, 2016, which designated the United States and has been published as International Publication No. WO 2017/093109 and which claims the priority of European Patent Application, Serial No, 15197610.7, filed Dec. 2, 2015, pursuant to 35 U.S.C. 119(a)-(d),

BACKGROUND OF THE INVENTION

The invention relates to a method for determining the rigidity of a drivetrain for linear movement of a machine component along a linear guide of a machine, in particular of a machine tool or a production machine, wherein the drivetrain comprises a motor with a motor-measuring system, wherein the linear guide is assigned a length-measuring system for determining the position of the machine component and wherein the machine comprises a numerical controller for closed-loop control of the movement of the machine component.

The invention further relates to a numerical controller and to a machine for carrying out the method.

The objective pursued by manufacturers of machines, especially of machine tools and production machines, is that all machines of a series have the same mechatronic characteristics. Discrepancies are as a rule an indication of lack of quality and must therefore be detected at an early stage.

The operator of a machine would like to insure that, where possible, the machine exhibits the same mechatronic characteristics during its lifetime as it had when it was delivered. Discrepancies can be caused by the failure of components for example and can have downtime as a consequence or, with a machine tool, can lead to low-quality workpieces.

Knowledge of the mechatronic characteristics of the machine is of decisive importance for both the manufacturer and the operator of the machine. It is therefore not surprising that a plurality of tests, by means of which the mechatronic characteristics of a machine can be detected or checked, is known. Examples of said tests are those relating to the positional accuracy of a tool, relating to the friction or relating to the vibration behavior of a machine. As a rule these tests require highly precise and therefore accordingly high-cost measurement equipment to carry out the corresponding measurements.

Carrying out condition monitoring for a machine is known from publication EP2690513A1, in which a dynamic model of the machine is provided and subsequently a frequency analysis is carried out for the machine to determine the values of model parameters. In this way spring stiffnesses of drivetrains of the machine can be established.

A machine diagnosis method and also a facility are known from DE 10 2008 064 391 A1, by means of which a diagnosis of a state or degree of damage such as e.g. the wear of a part or an increase in the working resistance of a machine tool or of an industrial machine can be created. In this process a drive element is moved by a closed-loop position control facility in a predetermined way and the position of the drive element is measured directly by means of a first sensor and measured indirectly by a second sensor detecting the rotational position of a servo motor driving the drive element. On the basis of the difference between the sensor signals an elastic deformation of the drive element is established and, based thereon, information about the state of the machine is built up.

SUMMARY OF THE INVENTION

The object of the present invention is to determine, in a simple and low-cost manner, the rigidity of the drivetrain for linear movement of a machine component along a linear guide of a machine.

This object is achieved by a method for determining the rigidity of a drivetrain for linear movement of a machine component along a linear guide of a machine, in particular of a machine tool or a production machine, wherein the drivetrain includes a motor with a motor-measuring system, wherein the linear guide is assigned a length-measuring system for determining the position of the machine component and wherein the machine includes a numerical controller for closed-loop control of the movement of the machine component, with the method including the steps of predetermining a constant acceleration for the machine component by means of the numerical controller, determining by the numerical controller of a difference between a position of the machine component derived from the motor-measuring system and a position of the machine component measured at the same time by the length-measuring system during the acceleration phase, assigning the difference to the acceleration or to a force required for the acceleration and storage in the numerical controller of the pair of values established in this way and/or of a rigidity value emanating from the pair of values.

According to another aspect of the invention, the object is further achieved by a numerical controller for carrying out the method and also by a machine with a corresponding numerical controller.

In accordance with the invention the rigidity of a drivetrain for linear movement of a machine component along a linear guide of the machine, in particular of a machine tool or a production machine, is determined. The drivetrain comprises a motor with a motor-measuring system. The linear guide is further assigned a length-measuring system for determining the position of the machine component. The machine also comprises a numerical controller for closed-loop control of the movement of the machine component. To determine the rigidity, the numerical controller initially pre-specifies a constant acceleration for the machine component. At at least one specific point in time during the acceleration phase the position of the machine component is obtained from the position value measured by the motor-measuring system. This is possible since the transmission ratio of the drivetrain between the motor and the machine component is known. Furthermore the position of the machine component is acquired for this same point in time by the length-measuring system. Subsequently the difference between the two measured values is established. This difference is stored in the numerical controller in a table of values together with the pre-specified acceleration or a force established from the acceleration via the relationship $F=m*a$. In addition or as an alternative a rigidity value of the drivetrain, which is produced from the quotient of the force and the difference of the two position measurement results, is stored in the numerical controller. This method of operation is now repeated for different accelerations and/or for machine components of different masses, in particular until such time as the rigidity in the relevant acceleration range for the drivetrain involved or the masses in question relating to the machine component is determined with sufficient precision.

The rigidity of a drivetrain is an important characteristic of a machine. Valuable information about the state of the machine can be derived in particular from a change in the rigidity over the lifetime of the machine. Ultimately this state of the machine allows conclusions to be drawn about the quality of the workplaces produced with the machine that can be achieved.

It is evident that the measured values created by the motor-measuring system and the measured values created by the length-measuring system have an accuracy through which the elasticity or the compliance of the drivetrain between the motor and the moved machine component and thus the rigidity of the drivetrain is able to be determined sufficiently precisely.

It is known that the rigidity of a drivetrain, which, from a rotating movement of the motor, creates a linear movement of a machine axis, is barely influenced by the torsion elements such as belt or gears. It is the rigidity that is embodied as a linear pressure that is dominant. With a ball screw this is the compression-tension rigidity of the ball screw spindle, the deflection in the axial bearing and the rigidity of the spindle nut. The force that moves the machine table is directed via these rigidities. With a rack-and-pinion system the toothed wheel that engages into the rack is compressed and in addition there is the tooth rigidity of the teeth.

The invention offers the advantage of only components that are present in the machine in any case being used to determine the rigidity of the drivetrain. In particular the motor-measuring system as well as the length-measuring system are available for example for exact positioning of a machine component such as a machine table, a workpiece holder or a tool holder in a normal machine tool. Therefore it is merely a clever processing of the measured values or data generated in any case in the numerical controller of the machine that is performed. For the operator of the machine this means no additional outlay.

Unlike with an ideal spring, no linear relationship is produced in a drivetrain of a machine between the change in length and the force. Conversely this means that the rigidity of the drivetrain depends on the force or the change in length.

Advantageously, from a plurality of measurements, a characteristic curve of the rigidity is determined and stored in the numerical controller. As an alternative, if required, intermediate values between individual measurement points can also be established in the known way by interpolation.

From a comparison of the rigidities established at different times for a specific machine or a comparison of the rigidities between a number of machines of the same design, the current state of the machine involved can be deduced. Thus for example it can be concluded from a drop-off in the rigidity that the pre-tensioning of the ball screw has decreased.

In establishing the rigidity of a drivetrain for moving a machine component, the friction force to be overcome to move the machine component occurs as a disturbance variable. Therefore, to establish more precise rigidity values, the friction force is taken into consideration or compensated for in the calculation. A known method for establishing the friction force of a machine tool is based on the so-called circular shape test. In conjunction with the invention however, this measurement has the disadvantage that the drive axes are subjected to constantly changing accelerations.

Therefore, in conjunction with the invention, other measurement methods for determining the friction force offer advantages over the circular shape test. In a first method the friction force is established from a plurality of measurements of the power consumption of the motor, at which the machine component is moved at different speeds, but is moved at a constant speed during the respective measurement. Through the plurality of measurements the friction force is thus established as a function of the speed. The relationship between force, mass, acceleration and friction force is expressed in the formula $F=m*a+F_R$. Since the speed of the machine component is known at any point in time during the rigidity measurement, the friction force can be taken into consideration or compensated for for the respective speed. Then it is not the values relating to the overall force determined in accordance with above formula, but the values relating to the friction reduced by the force $F'=F-F_R$ that are stored in the controller or assigned to the difference between the values measured by the position measurement system.

An alternate method for determining the friction force as a function of the speed with which the machine component is moved is to establish the so-called Stribeck curve by means of measurement technology. The Stribeck curve of a machine axis is determined by moving the axis at different speeds that are constant during the respective measurement however. The force necessary to overcome the friction follows from the moment of torque of the motor. Each movement at a specific speed produces a point on the Stribeck curve. Since the friction can also be dependent on the position of the axis in the machine, it makes sense to establish a number of such Stribeck curves for the axis as a function of the position and to store them in the controller.

Overall the compensation for the friction leads to more precise values in relation to the established rigidity of a drivetrain.

As well as the friction, a compensation for the moments of inertia in the determination of the rigidity can also lead to an improvement in the accuracy of the established values. The force of the motor established via the power consumption namely contains not only the force needed for the linear movement of the machine component, but also the share for overcoming the moment of inertia of all components moved rotationally, especially of the spindle. Their share is also able to be established if required by means of known measurement technology methods and eliminated for the rigidity values.

To determine the force required by the motor to accelerate the machine component the mass of the machine component must be known. With machine tools the mass of a machine component moved via the drivetrain is known as a rule and is held in the controller. To calculate the force there can then be recourse to the known mass of the respective machine component. However, should the mass of the moved machine component not be known for a specific machine, this can also be established by means of components present in any case by measurement technology. The measurement is based here essentially on the determination of the motor torque at a constant accelerated movement of the machine components. During the determination of the mass too the friction is advantageously compensated for as described above.

The invention offers the advantage that, from the established rigidity of the drivetrain and in particular from the change of the rigidity during the running time of the machine or from the comparison of the established rigidities of machines of the same design, deductions can be made about characteristics or the current state of the drivetrain of a specific machine. Thus for example, from the flattening out of the rigidity curve, especially at the zero crossing, conclusions can be drawn about a decreasing pre-tensioning. The reduction of the pre-tensioning worsens the positioning accuracy of the machine. This can have effects on the quality of workpieces produced with the machine. Advantageously the numerical controller of the machine involved is programmed so that the deviation of the established rigidity from an ideal rigidity is registered and evaluated and the controller executes specific functions based on this evaluation. These include for example a notification to a user relating to the decreasing rigidity, the triggering of an alarm, the display of a requirement for maintenance or even stopping the machine involved. Advantageously the selected function depends on the level of deviation of the rigidity from an ideal value. Furthermore the closed-loop control behavior of the numerical controller can advantageously be adapted to the reduced rigidity established, for example by values for the maximum possible acceleration or the maximum possible jerk being lowered.

BRIEF DESCRIPTION OF THE DRAWING

The invention will be explained in greater detail below on the basis of exemplary embodiments. In the figures:

FIG. 4 shows the method steps when carrying out an inventive method.

DETAILED DESCRIPTION OF PREFERRED EMBODIMENTS

Figure 1:
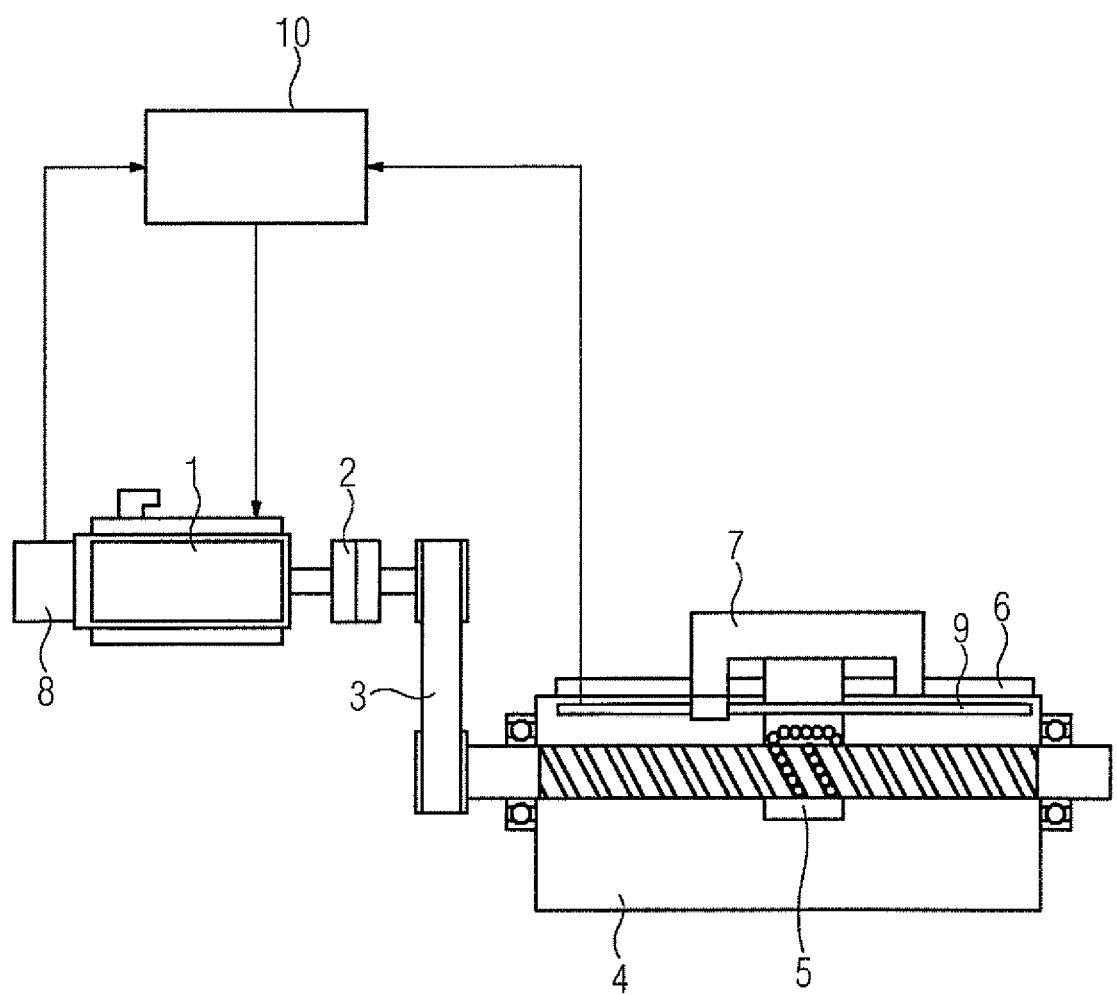
FIG. 1 shows a drivetrain of a machine tool.

FIG. 1 shows a schematic diagram of an example of a drivetrain of a machine tool. This comprises a rotating servo motor 1 which drives a ball screw drive 5 fastened to a machine bed 4 via a clutch 2 and a toothed belt 3. The ball screw drive 5 converts the rotational movement of the motor via a spindle and a nut into a translational movement of a machine table 7. For precise guidance of the movement of the machine table 7 there are linear guides 6 present. The position of the machine table 7 in relation to the machine bed 4 can be determined via the motor sensor 8 in conjunction with the known transmission ratio of the transmission elements. Moreover this position can also be determined directly via the length-measuring system 9.

For positioning the machine table 7 a numerical controller 10 is further provided, which activates the motor 1 via power converters (not shown) and to which the sensor signals of the motor sensor 8 and of the length-measuring system 9 are supplied for controlling the movement of the motor 1 or of the machine table 7.

The layout shown in FIG. 1 involves a typical drivetrain for exact positioning of a workpiece or of a tool within a machine tool. This layout can be used without further aids—except for suitable software—to determine the rigidity of the drivetrain. For the subsequent calculations the mass of the machine table 7 must be known in the controller 10. In the simplest case the mass M of the machine table 7 is known in advance and only has to be stored in the controller 10 by corresponding user entries. If the mass M of the machine table 7 is not known, it can be established on the basis of measurements of the motor torque during a movement of the machine table 7 with a predetermined acceleration.

Figure 2:
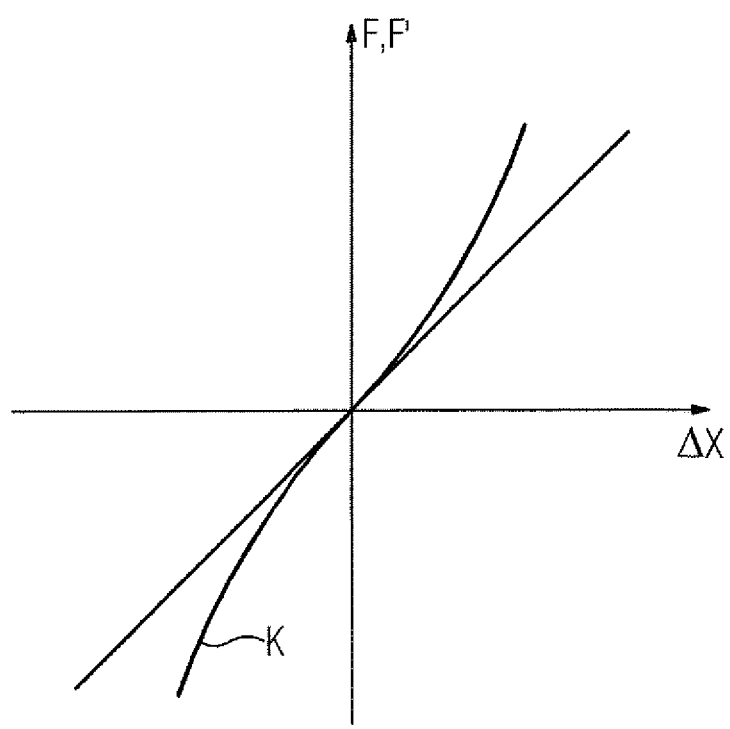
FIG. 2 shows a rigidity curve of the drivetrain.

In a first method step for determining the rigidity of the drivetrain, a constant acceleration a for the movement of the machine table 7 is now predetermined by the numerical controller 10. At at least one specific point in time during this acceleration phase the position of the machine table 7 is determined, both on the basis of the sensor signal of the motor sensor 8 and also on the basis of the measured value concerned of the length-measuring system 9. Because of the finite rigidity of the drivetrain, a difference $\Delta x$ of the two measured position values is produced. This difference $\Delta x$ is stored in the controller 10 for the predetermined acceleration or for the force required to reach the acceleration. Subsequently the process is repeated for a number of different accelerations. It should be noted that the measurement processes can also be carried out for negative accelerations, i.e. braking processes. A plurality of measurements enable a characteristic curve of the force F over the position difference $\Delta x$ to be specified in this way. An example of this type of characteristic curve K is shown in FIG. 2, which describes the force F or the force F' reduced by the friction plotted against the change in length $\Delta x$. The striking aspect here is that—unlike for an ideal spring—a non-linear relationship is involved. In particular the force F or F' increases disproportionately as $\Delta x$ increases.

The accuracy of the characteristic curve established in this way naturally increases with the number of measurements carried out. However a corresponding characteristic curve can already be determined with few measurement points by means of mathematical methods known per se. Since the characteristic curve is of interest, especially at its zero crossing, for information about the state of the machine, it is recommended to place the measurement points close to one another, particularly in this area.

As well as the predetermination of different accelerations, the relationship sought can also be obtained from machine components of different mass. However this requires a change to the machine between the individual measurements and is therefore associated with greater effort. For example the machine component can involve a tool holder in conjunction with a tool clamped therein. Then, by using different tools, measurements for machine components can be carried out, which differ in respect of their mass. This procedure too is largely able to be automated through the option of automatic tool changing available with many machine tools.

Figure 3:
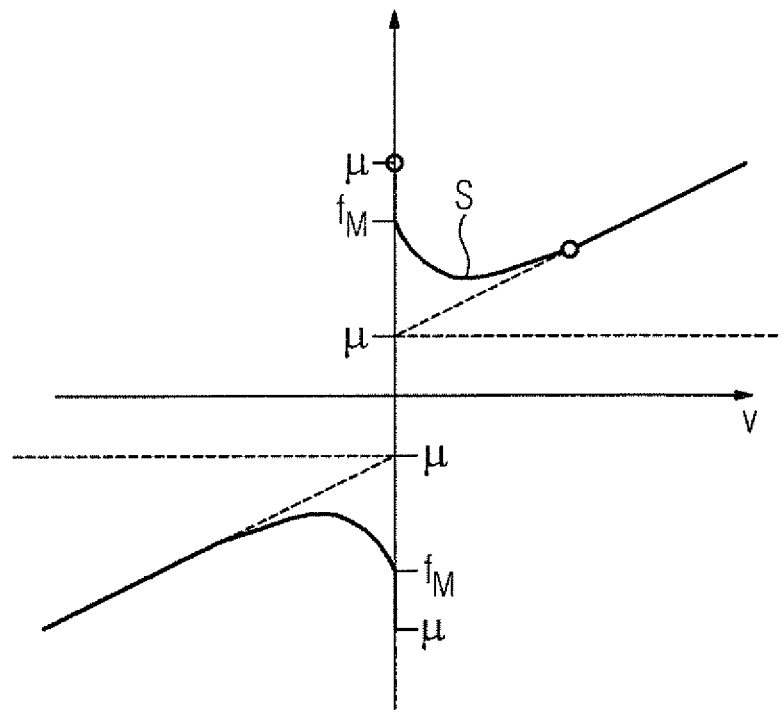
FIG. 3 shows a Stribeck curve for establishing and compensating for the friction.

More precise results in relation to the established rigidity are produced when the friction also present in the drivetrain is taken into consideration. In this case the friction is advantageously determined by moving the axis at different constant speeds by evaluation of the power consumption needed for the respective constant travel. The description of the curve of the friction established in this way as a function of the speed of movement is also known as the so-called Stribeck curve. An example of such a Stribeck curve S for describing the friction p plotted against the speed v is shown in FIG. 3. The striking aspect here is the jump at the zero crossing point, which results from the adhesion friction.

If the friction in accordance with the Stribeck curve is known for the relevant speed range, then the friction can also be taken into consideration for the previously described accelerated movement of the machine table 7. The share of the friction $F_R$ can thus be calculated out using the relationship $F'=m*a-f_R$ during the determination of the rigidity.

The calculating out of the friction has the advantage that through this there is not a mixture of two causes for the machine characteristics changed over the runtime of the machine, which would make it more difficult to determine the cause of a specific changed machine property. Unlike with a changed rigidity of the drivetrain, the causes of increased friction namely lie for example in the area of the bearings and guides or the lubrication of said drivetrain.

Both the established rigidity and also the friction can depend on the position of the machine table 7 in relation to the machine bed 4. Thus it can be sensible to determine the rigidity or the friction for different positions of the machine table 7 along the linear guide, as explained above.

The rigidity is a significant property of a drivetrain. In particular from a comparison of the rigidities between machines of the same design or from a comparison of the rigidities established at different points in time during the lifetime of a specific machine, conclusions can be drawn about specific characteristics or the state of the machine at a specific point in time, in particular about the current state of the machine. A corresponding evaluation of the results produced by a number of rigidity measurements can be carried out directly by means of the controller 10. Naturally a corresponding evaluation can also be undertaken however in a computing device connected to the numerical controller 10. In particular a flattening off of the characteristic rigidity curve at the zero crossing points to a loss of the pre-tensioning of a ball screw. The controller or the external computing device can react to this with different measures. Thus an appropriate function of the controller can consist of alerting the user that maintenance is required. With a serious deviation there can even be an automatic decommissioning of the machine involved. As well as the reactions given by way of example, the controller 10 can however also adapt its closed-loop control behavior automatically to the changed circumstances. Thus it is of advantage if, with a loss of pre-tension of the ball screw, the amplification of the position control circuit is reduced automatically. Further the loss of pre-tension is also accompanied by a deterioration of the dynamic accuracy, so that advantageously the values predetermined by the numerical controller 10 in relation to the maximum jerk and the maximum acceleration are reduced.

FIG. 4 successively describes the significant method steps of a preferred inventive method for determining the rigidity of a drivetrain for linear movement of a machine component along a linear guide of a machine, in particular a machine tool or production machine, wherein the drivetrain comprise a motor with a motor-measuring system, wherein the linear guide is assigned a length-measuring system to determine the position of the machine component and wherein the machine comprises a numerical controller for closed-loop control of the movement of the machine components:

In a first method step S1 the friction force is advantageously first established from a plurality of measurements of the power consumption of the motor, in which the machine component is moved at different speeds, but is moved at a constant speed during the respective measurement. The relationship between speed and friction is preferably established in the form of a Stribeck curve and stored in the numerical controller.

In a subsequent second method step S2 a constant acceleration for the machine component is predetermined by the numerical controller and the machine component is accelerated accordingly.

Subsequently, in a third method step S3, a difference $\Delta x$ between a position of the machine component derived from the measurement system and a position of the machine component measured at the same time by the length-measuring system during the acceleration phase is determined by the numerical controller.

Thereafter, in a fourth method step S4, the difference $\Delta x$ is assigned the acceleration a defined at the start or a force F required for the acceleration and the pair of values thus established and/or a rigidity value emanating from the pair of values is stored in the numerical controller. In the assignment of $\Delta x$ to F the influence of the friction established in method step S1 is advantageously calculated out in accordance with the formula $F'=m*a-F_R$.

The method steps S1 to S4 are subsequently repeated for a plurality of measurements with different accelerations and/or different masses, until such time as the desired precision in relation to the relationship between $\Delta x$ and F or F' is achieved.

Preferably the measurement points are connected to form the characteristic curve in a method step S5 by mathematical methods known per se and are accordingly stored in the numerical controller.

What is claimed is:

1. A method for determining a rigidity of a drivetrain having a screw drive for moving a machine component along a linear guide of a machine, said method comprising the steps of:
    under control of a numerical controller, imparting during an acceleration phase on a rotary motor having a first position sensor and being operatively connected to the linear screw drive a constant acceleration for the machine component;
    measuring during the acceleration phase with the first position sensor a first position of the machine component;
    measuring simultaneously during the acceleration phase with a length-measuring system operably connected to the linear guide a second position of the machine component along the linear guide;
    determining a difference between the first position and the second position; associating the difference with the constant acceleration or with a force producing the constant acceleration; and
    storing in the numerical controller a value pair composed of the determined difference and the constant acceleration or a rigidity value derived from the value pair.

2. The method of claim 1, wherein the machine is a machine tool or a production machine.

3. The method of claim 1, further comprising repeating the method steps for different machine components and/or for different constant accelerations until an abort criterion is reached.

4. The method of claim 3, further comprising determining a characteristic curve from the value pairs established for different constant accelerations, and storing the characteristic curve in the numerical controller.

5. The method of claim 1, further comprising determining a friction force to be overcome for moving the machine component, and compensating the friction force.

6. The method of claim 5, wherein the friction force is determined from a plurality of measurements of a power consumption of the motor, during which the machine component is moved at different constant speeds.

7. The method of claim 5, further comprising establishing a Stribeck curve using measurement technology for determining the friction force as a function of a speed with which the machine component is moved.

8. The method of claim 7, further comprising determining a plurality of Stribeck curves as a function of the position of the machine component in relation to the linear guide.

9. The method of claim 1, further comprising specifying to the numerical controller a mass of the machine component.

10. The method of claim 9, wherein the mass of the machine component is derived by the numerical controller from the force producing the constant acceleration.

11. The method of claim 1, further comprising determining the rigidity of the drivetrain at different points in time, and inferring from a comparison between the rigidity determined at different points in time characteristic properties of the drivetrain.

12. The method of claim 1, further comprising determining the rigidity of a number of drivetrains of identical design installed at a number of machines, and inferring from a comparison of the rigidities established for the drivetrains of the identical design characteristic properties of the respective drivetrains.

13. The method of claim 11, wherein the numerical controller carries out predetermined functions depending on the characteristic properties of the drivetrain.

14. The method of claim 12, wherein the numerical controller carries out predetermined functions depending on the characteristic properties of the respective drivetrains.

15. A numerical controller for closed-loop control of a movement of a machine component of a machine moving along a linear guide, said numerical controller being configured to impart during an acceleration phase on a rotary motor having a first position sensor and being operatively connected to a linear screw drive which moves the machine component a constant acceleration on the machine component;

measure during the acceleration phase with the first position sensor on the motor a first position of the machine component;

measure simultaneously during the acceleration phase with a length-measuring system operably connected to the linear guide a second position of the machine component along the linear guide;

determine a difference between the first position and the second, postion;

form a value pair composed of the determined difference and the constant acceleration or a force producing the constant acceleration; and store the value pair and/or a rigidity value derived from the value pair.

16. A machine, comprising:

a machine bed;

a machine table;

a linear guide secured to the machine bed and guiding the machine table along the machine table;

a length-measuring system operably connected to the linear guide for measuring a first position of the machine component relative to the machine bed;

a drivetrain comprising a screw drive which converts a rotational movement of a rotating motor into a translational movement of the machine table; a motor-measuring system comprising a motor sensor which determines from a known transmission ratio of transmission elements of the drive train a second position of the machine table in relation to the machine bed; and a numerical controller configured to impart during an acceleration phase a constant acceleration on the machine component along the linear, measure during the acceleration phase simultaneously the first position and the second position, and determine a difference between the measured first position and second position, associated the difference with the constant, acceleration or with a force producing the constant acceleration, and store a value pair composed of the determined difference and the constant acceleration or and/or a rigidity value derived from the value pair.

* * * * *

UNITED STATES PATENT AND TRADEMARK OFFICE
CERTIFICATE OF CORRECTION

PATENT NO. : 10,481,578 B2
APPLICATION NO. : 15/780547
DATED : November 19, 2019
INVENTOR(S) : David Bitterolf et al.

It is certified that error appears in the above-identified patent and that said Letters Patent is hereby corrected as shown below:

On the Title Page

[56] FOREIGN PATENT DOCUMENTS:
Replace "EP 2 690 613 A" with the correct -- EP 2 690 513 A --.
Correct the publication date of "JP 2000322116 A" to read -- 11/2000 --.

In the Claims

In Column 10, Claim 16, Line 33:
Replace "associated" with -- associate --.

Signed and Sealed this
Twenty-eighth Day of January, 2020

Andrei Iancu
*Director of the United States Patent and Trademark Office*